United States Patent
Luo et al.

(10) Patent No.: US 12,512,976 B2
(45) Date of Patent: Dec. 30, 2025

(54) POSITION REPORT AUTHENTICATION

(71) Applicant: QUALCOMM Incorporated, San Diego, CA (US)

(72) Inventors: Ning Luo, Cupertino, CA (US); Yuxiang Peng, Sunnyvale, CA (US); Gengsheng Zhang, Cupertino, CA (US); Min Wang, Tustin, CA (US); Furqan Ahmed, Eastvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/316,982

(22) Filed: May 12, 2023

(65) Prior Publication Data

US 2024/0380584 A1    Nov. 14, 2024

(51) Int. Cl.
| | |
|---|---|
| H04L 9/08 | (2006.01) |
| H04L 9/30 | (2006.01) |
| H04L 9/32 | (2006.01) |
| H04W 4/029 | (2018.01) |

(52) U.S. Cl.
CPC .............. *H04L 9/0866* (2013.01); *H04L 9/30* (2013.01); *H04L 9/3247* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2005/0120208 A1* | 6/2005 | Albert Dobson ....... | H04L 43/00 713/160 |
| 2010/0119061 A1* | 5/2010 | Kawale ................... | H04L 9/302 380/44 |
| 2013/0060955 A1 | 3/2013 | Enge | |
| 2022/0377504 A1* | 11/2022 | Kondrashov .......... | H04L 67/52 |
| 2023/0046380 A1 | 2/2023 | Medvinsky et al. | |
| 2025/0112770 A1* | 4/2025 | Horovitz ............... | H04L 9/0861 |

FOREIGN PATENT DOCUMENTS

EP    3672309 A1    6/2020

OTHER PUBLICATIONS

International Search Report and Written Opinion—PCT/US2024/027645—ISA/EPO—Jul. 4, 2024.

* cited by examiner

*Primary Examiner* — Atta Khan
(74) *Attorney, Agent, or Firm* — Weaver Austin Villenueve & Sampson LLP

(57) ABSTRACT

An example method of position information authentication for a location application performed by a UE, the method comprising determining by a position engine, a position estimate of the UE and determining by the position engine, a position report message indicating the position estimate. The method also comprises determining by a security module, a digital signature generated using a first private key known to the UE and the position report message. The method further comprises transmitting the position report message associated with the digital signature to a location application executed by the UE or another device, wherein the location application is configured to provide one or more location-based services to the UE using the position estimate responsive to a successful authentication of the position report message using the digital signature generated based on the first private key.

28 Claims, 9 Drawing Sheets

POSITION REPORT AUTHENTICATION

BACKGROUND

1. Field of Disclosure

The present disclosure relates generally to the field of wireless communications, and more specifically to authenticating location information for a location application.

2. Description of Related Art

With the increasing popularity of User Equipments (UEs) such as smartphones, tablets, and wearables, location-based applications have become an essential part of many people's lives. Based on a position estimate of the UE, these applications provide users with a wide range of location-based services such as navigation, local search, location-based advertising, social networking, etc. Because of the accuracy requirement of the position estimate, Global Navigation Satellite Systems (GNSS)s are widely used for determining the position estimate of the UE.

BRIEF SUMMARY

An example method of position information authentication for a location application performed by a UE, the method comprising determining by a position engine, a position estimate of the UE and determining by the position engine, a position report message indicating the position estimate. The method also comprises determining by a security module, a digital signature generated using a first private key known to the UE and the position report message. The method further comprises transmitting the position report message associated with the digital signature to a location application executed by the UE or another device, wherein the location application is configured to provide one or more location-based services to the UE using the position estimate responsive to a successful authentication of the position report message using the digital signature generated based on the first private key.

An example method of position information authentication for a location application performed by a server, the method comprising receiving, from a UE, a position report message indicating a position estimate of the UE and a unique identification (ID) associated with the UE, wherein the position report message is associated with a digital signature generated using a first private key known to the UE. The method also comprises determining the first private key using a first public key associated with the unique ID and authenticating the position report message using the digital signature generated based on the first private key. The method further comprises executing a location application, wherein the location application is configured to provide one or more location-based services to the UE using the position estimate responsive to a successful authentication of the position report message using the digital signature generated based on the first private key.

An example UE for geofencing for position information authentication for a location application comprising a transceiver, a memory, and one or more processors communicatively coupled with the transceiver and the memory. The one or more processors are configured to determine a position estimate of the UE and determine a position report message indicating the position estimate. The one or more processors are also configured to determine a digital signature generated using a first private key known to the UE and the position report message. The one or more processors are further configured to transmit the position report message associated with the digital signature to a location application executed by the UE or another device, wherein the location application is configured to provide one or more location-based services to the UE using the position estimate responsive to a successful authentication of the position report message using the digital signature generated based on the first private key.

An example server for position information authentication for a location application comprising a transceiver, a memory, and one or more processors communicatively coupled with the transceiver and the memory. The one or more processors are configured to receive, from a UE, a position report message indicating a position estimate of the UE and a unique identification (ID) associated with the UE, wherein the position report message is associated with a digital signature generated using a first private key known to the UE and determine the first private key using a first public key associated with the unique ID. The one or more processors are also configured to authenticate the position report message using the digital signature generated based on the first private key. The one or more processors are further configured to and execute a location application, wherein the location application is configured to provide one or more location-based services to the UE using the position estimate responsive to a successful authentication of the position report message using the digital signature generated based on the first private key.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
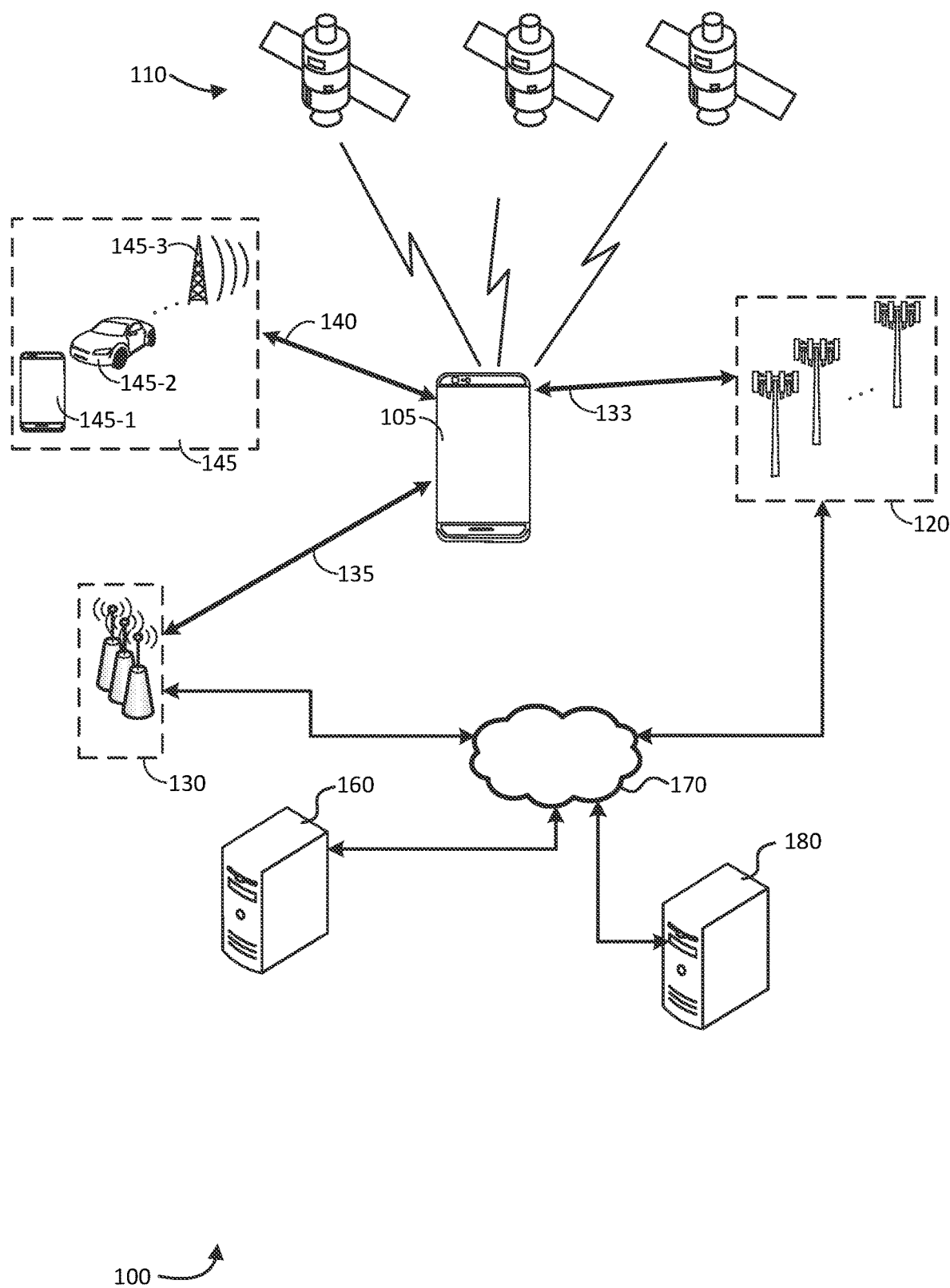
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

A critical issue faced by location-based applications is how to ensure the accuracy and integrity of the received position estimates. Spoofing attacks can occur when a position engine is compromised, and fake Global Navigation Satellite System (GNSS) signals are received, leading to inaccurate and unreliable location estimates. Anti-spoofing techniques have been suggested to prevent such attacks, but they may not be sufficient to protect the position estimate along the reporting pipe (e.g., one or more hardware and/or software components that relay the position estimate from the source of the position estimate (e.g., a position engine) to the destination of the position estimate (e.g., a location application)). For example, malicious software can hijack the position report pipe and replace the real position estimates with fake ones, leading to significant concerns. This raises the need for a more comprehensive solution to authenticate the position estimate received by the location-based applications. The technical solution disclosed herein may detect tampering with the position estimates along the reporting pipe, and thus, may provide a more secure and reliable location estimate to the location-based application.

Various aspects relate generally to the field of wireless communications, and more specifically to authenticating location information for a location application. In some examples, after being determined by a location engine, a position report message indicating the location estimate of the UE may be associated with a digital signature generated by a security module using a private key known to the UE. The position report message associated with the digital signature may be transmitted to a location application configured to provide one or more location-based services to the UE using the position estimate responsive to a successful authentication of the position report message using the digital signature generated based on the private key.

By implementing the subject matter described in this disclosure, the location estimate received by the location application can be protected from being tampered with. This could improve the accuracy, reliability, security, and user experience of the location application, providing significant benefits to the user.

FIG. 1 is a simplified illustration of a positioning system 100 in which a UE 105, location server 160, and/or other components of the positioning system 100 can use the techniques provided herein for determining an estimated location of UE 105, according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120 and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted, (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)) IEEE 802.11x (e.g., Wi-Fi®), Ultra-Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
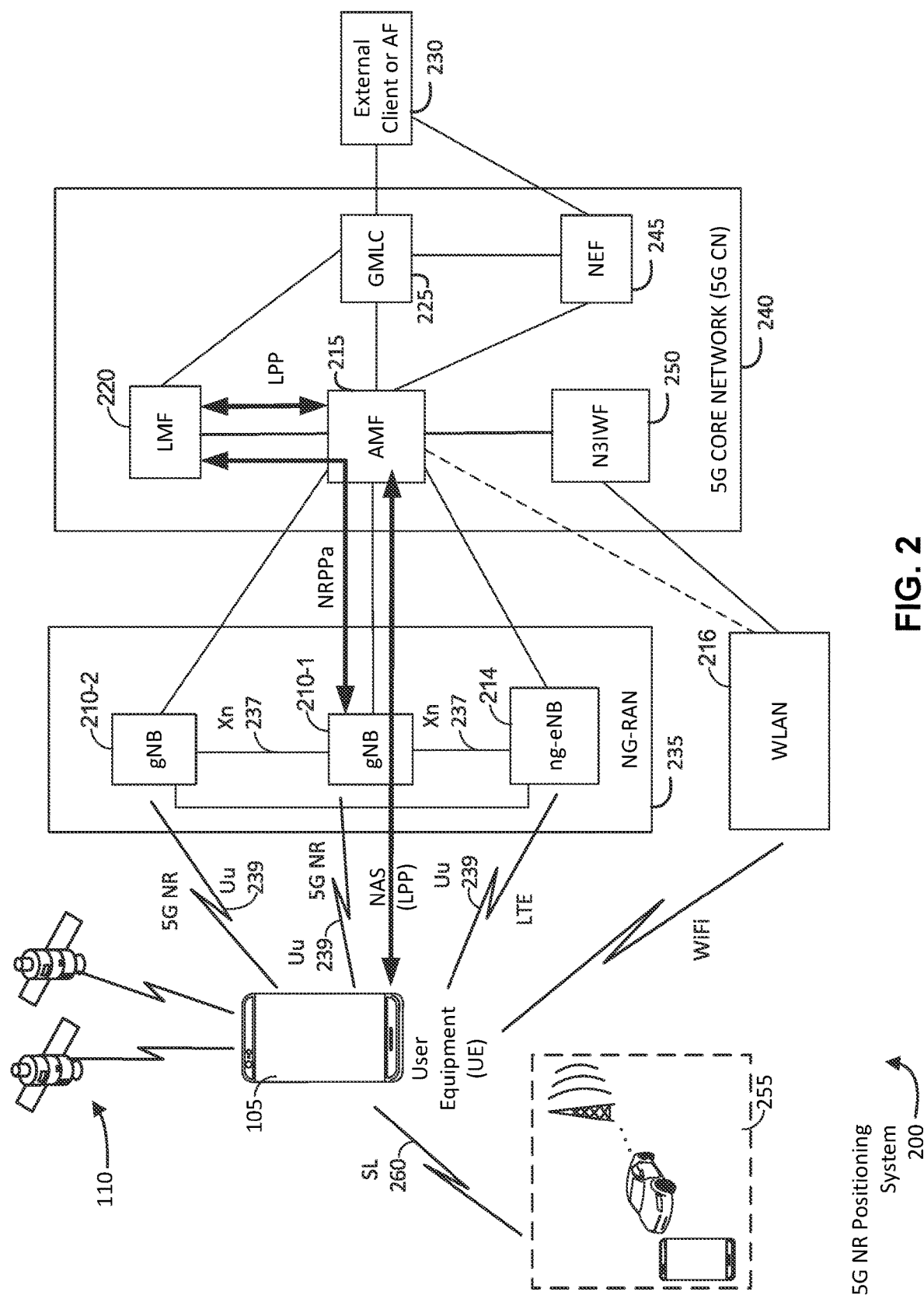
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High-Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-NB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network-based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220, described in more detail hereafter.

Positioning of the UE 205 in a 5G NR positioning system 200 further may utilize measurements between the UE 205 and one or more other UEs 255 via a sidelink connection SL 260. As shown in FIG. 2, the one or more other UEs 255 may comprise any of a variety of different device types, including mobile phones, vehicles, roadside units (RSUs), other device types, or any combination thereof. One or more position measurement signals sent via SL 260 to the UE 205 from the one or more other UEs 255, to the one or more other UEs 255 from the UE 205, or both. Various signals may be used for position measurement, including sidelink PRS (SL-PRS). In some instances, the position of at least one of the one or more of the other UEs 255 may be determined at the same time (e.g., in the same positioning session) as the position of the UE 205. In some embodiments, the LMF 220 may coordinate the transmission of positioning signals via SL 260 between the UE 205 and the one or more other UEs 255. Additionally or alternatively, the UE 205 and the one or more other UEs 255 may coordinate a positioning session between themselves, without an LMF 220 or even a Uu connection 239 to an access node of the NG-RAN 235. To do so, the UE 205 and the one or more other UEs 255 may communicate messages via the SL 260 using sidelink positioning protocol (SLPP). In some scenarios, the one or more other UEs 255 may have a Uu connection 239 with an access node of the NG-RAN 235 and/or Wi-Fi connection with WLAN 216 when the UE 205 does not. In such instances, the one or more other UEs 255 may operate as relay devices, relaying communications to the network (e.g., LMF 220) from the UE 205. In such instances, a plurality of other UEs 255 may form a chain between the UE 205 and the access node.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL. DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
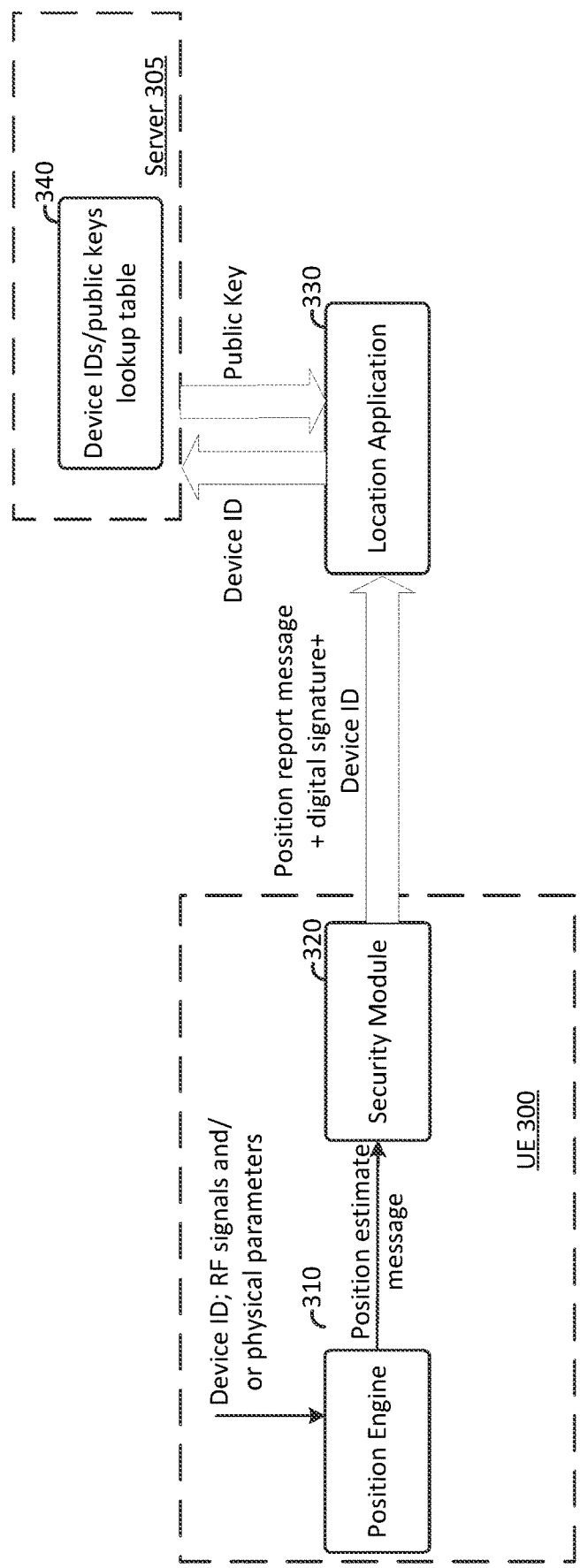
FIG. 3 is a diagram illustrating an example position information authentication system, according to an embodiment.

FIG. 3 is a diagram illustrating an example position information authentication system, according to an embodiment. As illustrated in FIG. 3, the position information authentication may be performed among a UE 300 (e.g., which may correspond to UE 105 in FIGS. 1 and 2) and a server 305 (e.g., which may correspond to location server 160 in FIG. 1 and/or LMF in FIG. 2). It is noted and will be disclosed in detail below that some of the functionalities (e.g., a location application 330) may be allocated differently among UE 300 and server 305 than shown in FIG. 3.

In some embodiments, UE 300 may include a position engine 310 configured to determine a position estimate of UE 300 based on RF signals and/or one or more of physical parameters such as distance, velocity, acceleration, rotation, magnetic fields, and signals from satellites, etc. UE 300 may also include a security module configured to generate digital signatures based on one or more private keys known to UE 300 and digitally sign a position report message indicating the position estimate. It is noted that security module 320 may be implemented in any suitable scheme such as being part of position engine 310, being separated from position engine 310 but still on a same chipset as position engine 310 or residing in a separate chipset than position engine 310.

For example, as shown in FIG. 3, position engine 310 may receive RF signals (e.g., GNSS signals) configured for determining a position estimate of UE 300 and/or one or more of physical parameters, depending on the sensor type used position engine 310. It is noted that the RF signals may be any suitable type of RF signals configured for positioning UE 300, and position engine 310 may determine the position estimate of UE 300 based on any suitable techniques using the received RF signals. The position estimate may also be determined using one or more IMU sensors, automotive sensors, cameras etc. by position engine 310. Based on the position estimate, position engine 310 may determine a position report message indicating the position estimate. It is noted that the position report message may use any suitable protocols to report the position estimate of UE 300.

In some embodiments, security module 320 may store one or more private keys known to UE 300 and may generate digital signature(s) using the one or more private keys for digitally signing the position report message. For example, after receiving the position report message from position engine 310, security module 320 may determine one or more digital signatures based on hash-based methods, Rivest-Shamir-Adlema (RSA)-based method, or elliptic curve-based methods using one of the private keys and the position report message (e.g., the content of the position report message).

Security module 320 may digitally sign the position report message using the determined digital signature. For example, security module 320 may associate the position report message with the digital signature generated based on the private key and the position report message. Security module 320 may transmit the association of the position report message and the digital signature to a location application 330. In some embodiments, the position report message may also indicate a unique identification (ID) associated with UE 300 (e.g., a device ID of UE 300 such as international mobile equipment identity (IMEI), international mobile subscriber identity (IMSI), media access control (MAC) address, etc.).

In some embodiments, location application 330 may be configured to provide one or more location-based services to UE 300 using the position estimate responsive to a successful authentication of the position report message using the digital signature. As will be discussed in detail below, the location application may be executed by UE 300 (e.g., the location application being UE-based) or another device (e.g., executed by a server).

In some embodiments, when authenticating the position report message received from the position engine, location application 330 may request a public key corresponding to the private key used for generating the digital signature from server 305. For example, location application 330 may transmit the device ID to server 305 (e.g., indicating the device ID in the request) where server 305 may determine the corresponding public key according to e.g., a device IDs/public keys lookup table 340. Responsive to the request, server 305 may transmit the corresponding public key to location application 330 where location application 330 may then authenticate the position report message using the digital signature generated based on the private key according to any suitable public key-private key authentication (also known as asymmetric encryption) mechanisms.

In some embodiments, responsive to a successful authentication of the position report message, location application 330 may provide location-based services (e.g., navigation, local search, location-based advertising, social networking) to UE 300 based on the position estimates indicated in the position report message.

In some embodiments, if location application 330 is unable to authenticate the position report message (e.g., responsive to location application 330 not successfully authenticating the position report message), location application 330 may choose to disregard the position estimate indicated in the position report message received from position engine 310 and/or abandon the position report message. This may indicate the report pipe has been tampered with.

In some embodiments, once the private key used by security module 320 for determining the digital signature used for signing the position report message is compromised (e.g., security module 320 gets hacked and the private key gets exposed), location application 330 may determine to disable UE 300 from receiving the location-based services and/or accessing location application 330.

Additionally or alternatively, in situations where, for example, the UE is of high value and/or difficult to replace, once the private key used by security module 320 for determining the digital signature used for signing the position report message is compromised, security module 320 may determine a subsequent digital signature based on a subsequent private key known to UE 300 and may digitally sign a subsequent position report message using the subsequent digital signature. Server 305 may transmit a subsequent public key corresponding to the subsequent private key used for generating the subsequent digital signature to location application 330 responsive to receiving the authentication request (e.g., request for the corresponding public key). Location application 330 may authenticate the subsequent position report message similar to the technical scheme disclosed above.

Figure 4:
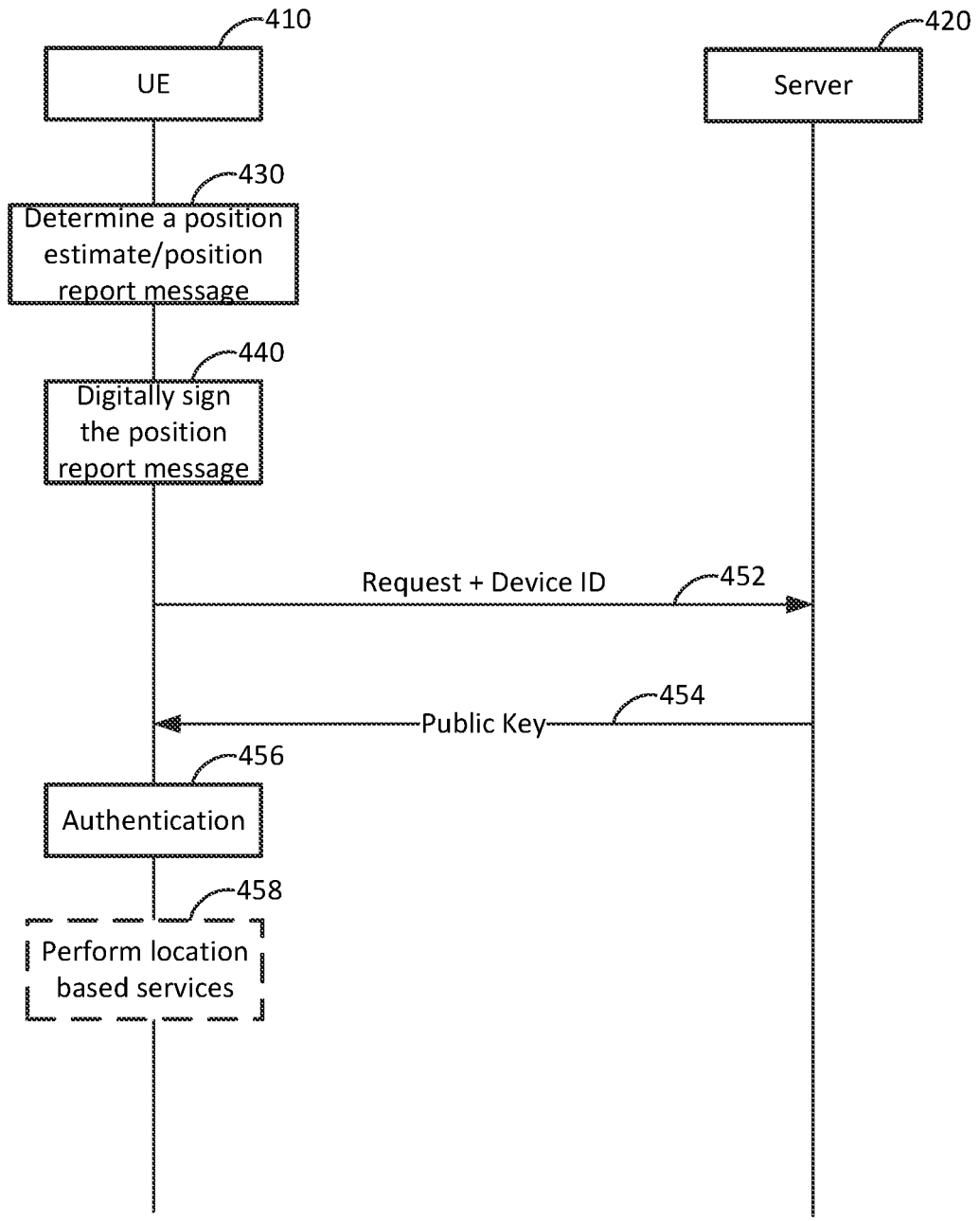
FIG. 4 is a flow diagram illustrating how a position information authentication may be performed for a UE-based location application, according to some embodiments.

FIG. 4 is a flow diagram illustrating how a position information authentication may be performed for a UE-based location application, according to some embodiments. As illustrated in FIG. 4, the position information authentication may be performed between a UE 410 and a server 420. In some embodiments, UE 410 may correspond to UE 105 in FIGS. 1 and 2 and/or UE 300 in FIG. 3. Server 420 may correspond to location server 160 in FIG. 1. LMF 220 in FIG. 2, and/or server 310 in FIG. 3.

In some embodiments, in case where the location application is UE-based (e.g., executed by UE 410), operations performed by UE 410 as shown in FIG. 4 may be performed as part of or in response to executing the location application.

Starting from block 430, UE 410 may determine a position estimate using RF signals and/or one or more of physical parameters and may determine a position report message indicating the position estimate. It is noted that the RF signals may be any suitable type of RF signals configured for positioning UE 410 and the position estimate may be determined based on any suitable techniques using the received RF signals. The position estimate may also be determined using one or more IMU sensors, automotive sensors, cameras etc. Based on the position estimate, a position report message indicating the position estimate may be determined accordingly.

In block 440, UE 410 may digitally sign the position report message. For example, as disclosed with respect to FIG. 3, in some embodiments, UE 410 may include a security module that stores one or more private keys known to UE 410 and may generate digital signature(s) based on the one or more private keys and the position report message for digitally signing the position report message. For example, the security module may determine one or more digital signatures based on hash-based methods, RSA-based methods, or elliptic curve-based methods using one of the private keys and the position report message (e.g., the content of position report message). The determined digital signature may be used for digital signing the position report message (e.g., associate the position report message with the digital signature generated based on the private key). In some embodiments, the position report message may also indicate a unique ID associated with UE 410 (e.g., a device ID of UE 410 such as IMEI, IMSI, MAC address, etc.).

At arrow 452, after receiving the digitally signed position report message, an authentication request for a public key corresponding to the private key used for generating the digital signature may be transmitted to server 420. In some embodiments, the request may include the device ID.

At arrow 454, server 420 may determine the public key (e.g., using a device IDs/public keys lookup table) based on the device ID and may transmit the determined public key to UE 410.

At block 456, the location application may perform the authentication of the digitally signed position report message based on the digital signature. For example, the location application may determine the private key using the public key received from server 420.

At block 458, responsive to a successful authentication of the digitally signed position report message, the location application may provide location-based services (e.g., navigation, local search, location-based advertising, social networking) to UE 410 based on the position estimates indicated in the position report message.

In some embodiments, responsive to the location application not successfully authenticating the position report message (e.g., if the location application is unable to authenticate the position report message), the location application may choose to disregard the position estimate indicated in the position report message and/or may abandon the position report message. This may indicate the report pipe has been tampered with.

In some embodiments, once the private key used by the security module of UE 410 for determining the digital signature used for signing the position report message is compromised (e.g., the security module gets hacked and the private key gets exposed), the location application may determine to disable UE 410 from receiving the location-based services and/or accessing the location application.

Additionally or alternatively, in situations where, for example, the UE is of high value and/or difficult to replace, once the private key used by the security module for determining the digital signature used for signing the position report message is compromised, the security module may determine a subsequent digital signature based on a subsequent private key known to UE 410 and a subsequent position report message may be digitally signed using the subsequent digital signature. Server 420 may transmit a subsequent public key corresponding to the subsequent private key used for generating the subsequent digital signature to the location application responsive to an authentication request (e.g., request for the corresponding public key). The location application may authenticate the subsequent position report message based on the technical scheme disclosed above.

Figure 5:
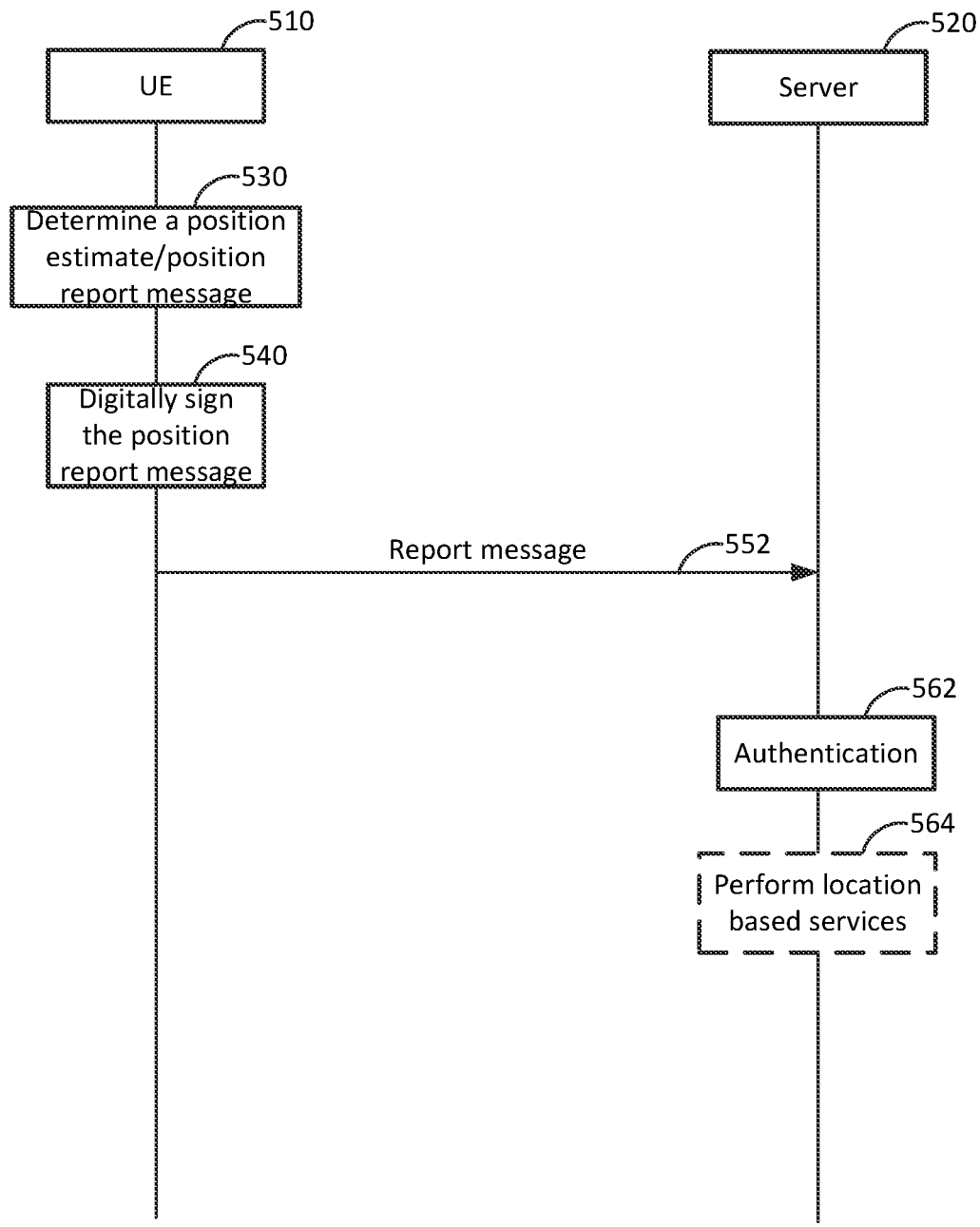
FIG. 5 is a flow diagram illustrating how a position information authentication may be performed for a UE-assisted location application, according to some embodiments.

FIG. 5 is a flow diagram illustrating how a position information authentication may be performed for a UE-assisted location application, according to some embodiments. As illustrated in FIG. 5, the position information authentication may be performed between an UE 510 and a server 520. In some embodiments, UE 510 may correspond to UE 105 in FIGS. 1 and 2 and/or UE 300 in FIG. 3. Server 520 may correspond to location server 160 in FIG. 1, LMF 220 in FIG. 2, and/or server 310 in FIG. 3.

In some embodiments, in case where the location application is UE-assisted (e.g., executed by server 520), the operations performed by server 520 as shown in FIG. 5 may be part of or responsive to executing the location application.

Starting from block 530, UE 510 may determine a position estimate using RF signals and/or one or more of physical parameters and may determine a position report message indicating the position estimate, similar to block 430 in FIG. 4.

In block 540, UE 510 may digitally sign the position report message using the digital signature generated by a security module of UE 510, similar to block 440 in FIG. 4.

At arrow 552, after receiving the digitally signed position report message, UE 510 may transmit the digitally signed position report message to server 520 for location-based services.

At block 562, server 520 may determine the public key (e.g., using a device IDs/public keys lookup table) and may perform the authentication of the digitally signed position report message based on the digital signature generated using the private key.

At block 562, responsive to a successful authentication of the digitally signed position report message, location application 560 may provide location-based services (e.g., navigation, local search, location-based advertising, social networking) to UE 510 based on the position estimates indicated in the position report message.

In some embodiments, responsive to location application 560 not successfully authenticating the position report message, location application 560 may abandon the received position report message. This may indicate the report pipe has been tampered with.

In some embodiments, once the private key used by the security module of UE 510 for determining the digital signature used for signing the position report message is compromised (e.g., the security module gets hacked and the private key gets exposed), location application 560 may determine to disable UE 510 from receiving the location-based services and/or accessing location application 560.

Additionally or alternatively, in situations where, for example, the UE is of high value and/or difficult to replace, once the private key used by the security module for determining the digital signature used for signing the position report message is compromised, the security module may determine a subsequent digital signature based on a subsequent private key known to UE 510 and a subsequent position report message may be digitally signed using the subsequent digital signature. Server 520 may move to a subsequent public key corresponding to the subsequent private key used for generating the subsequent digital signature accordingly. Location application 560 may authenticate the subsequent position report message based on the technical scheme disclosed above.

Figure 6:
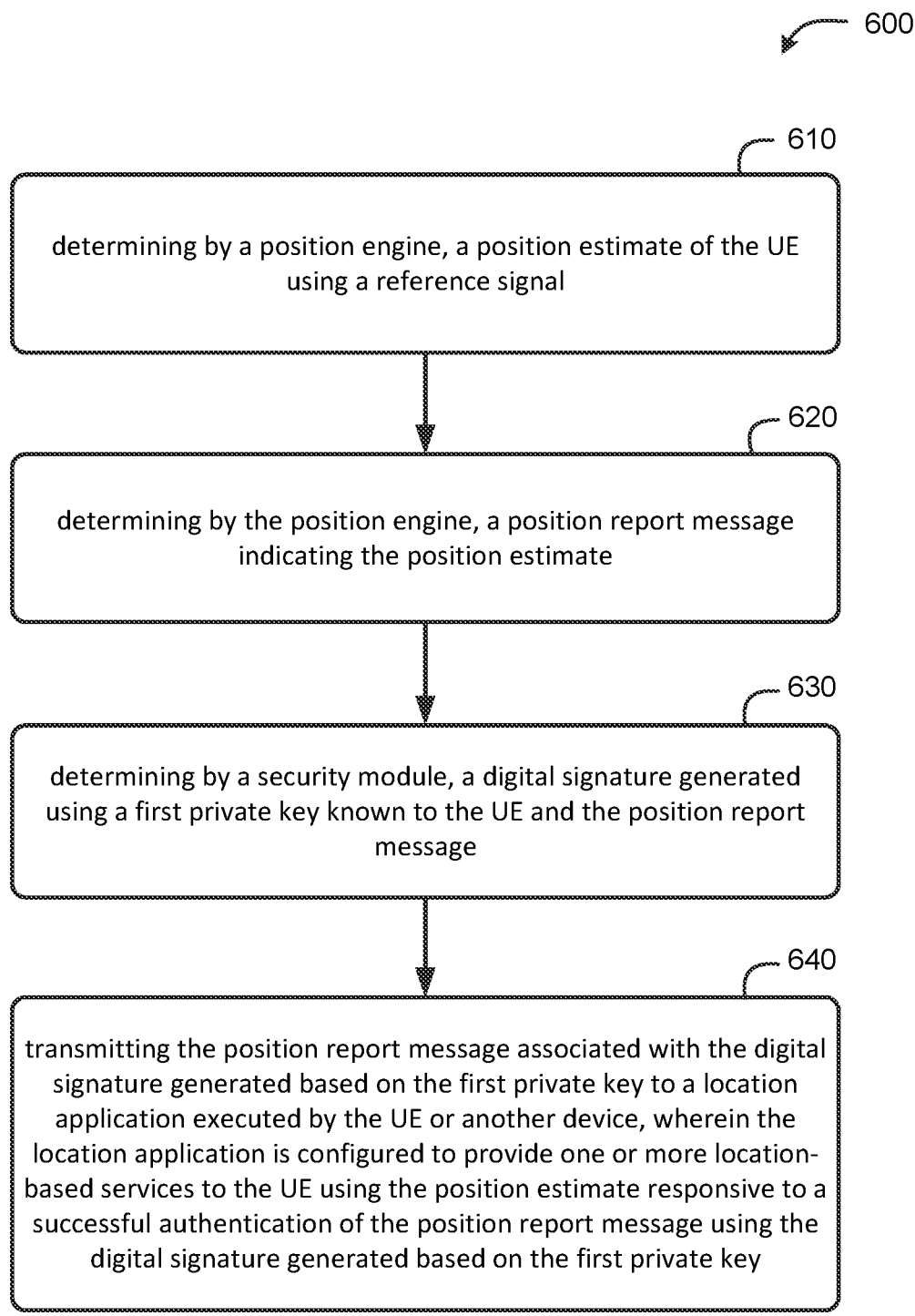
FIG. 6 is a flow diagram of a method for position information authentication for a location application, performed by a UE, according to an embodiment.
Figure 8:
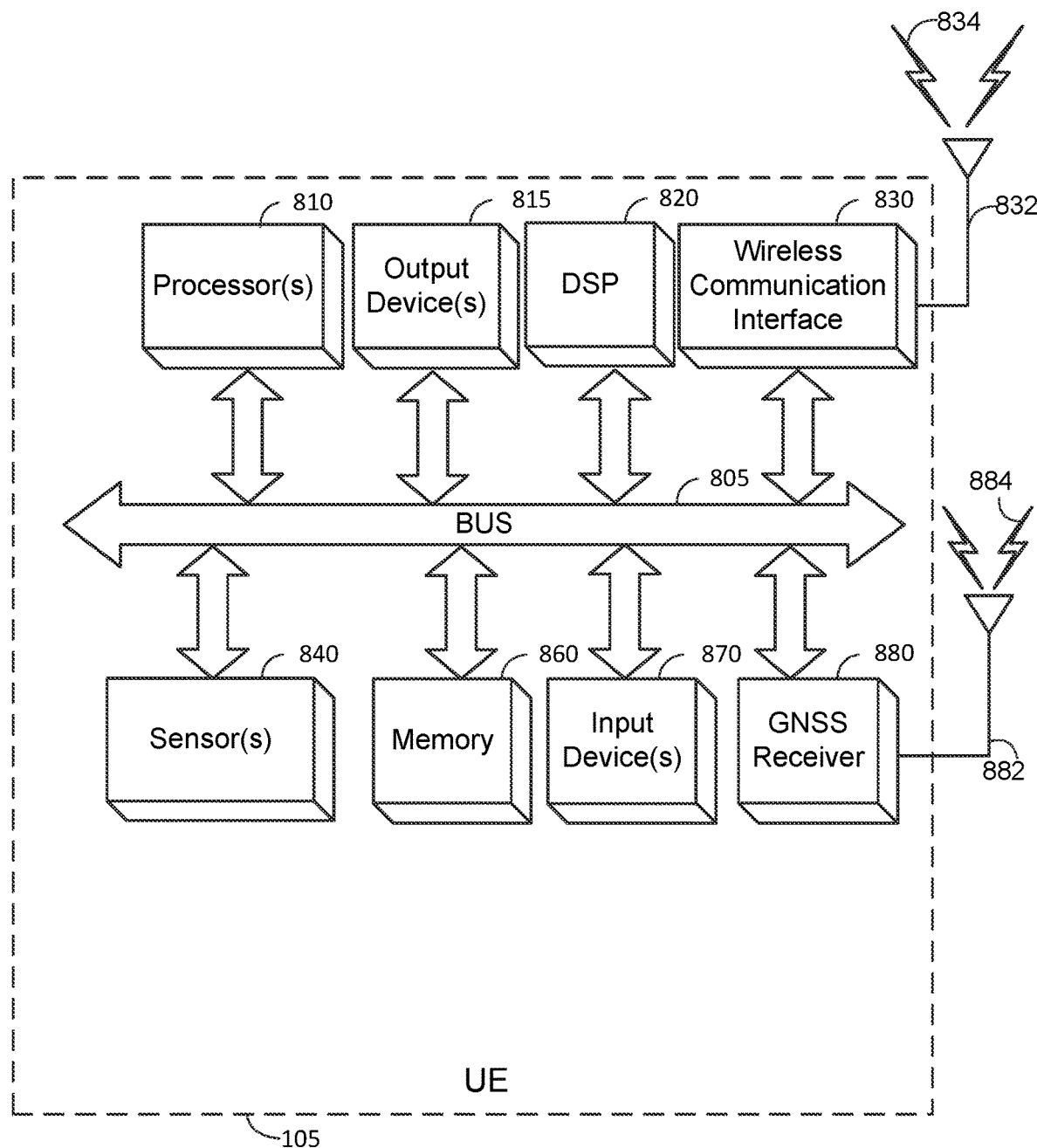
FIG. 8 is a block diagram of an embodiment of a UE, which can be utilized in embodiments as described herein.

FIG. 6 is a flow diagram of a method 600 for position information authentication for a location application, performed by a UE, according to an embodiment. In some embodiments, the UE may correspond to UE 105 in FIGS. 1 and 2, UE 300 in FIG. 3, UE 410 in FIG. 4, and/or UE 510 in FIG. 5. Means for performing the functionality illustrated in one or more of the blocks shown in FIG. 6 may be performed by hardware and/or software components of a UE. Example components of a UE are illustrated in FIG. 8, which is described in more detail below.

At block 610, the functionality comprises determining by a position engine, a position estimate of the UE using a reference signal (e.g., a RF signal). As noted above, the RF signals may be any suitable type of RF signals configured for positioning the UE and the position estimate may be determined based on any suitable techniques using the received RF signals. Based on the position estimate, a position report message indicating the position estimate may be determined accordingly. Means for performing functionality at block 610 may comprise a bus 805, processor(s) 810, wireless communication interface 830, memory 860, and/or other components of a UE 105, as illustrated in FIG. 8.

At block 620, the functionality comprises determining by the position engine, a position report message indicating the position estimate. It is noted that the position report message may use any suitable protocols to report the position estimate of the UE. Means for performing functionality at block 610 may comprise a bus 805, processor(s) 810, wireless communication interface 830, memory 860, and/or other components of a UE 105, as illustrated in FIG. 8.

At block 630, the functionality comprises determining by a security module, a digital signature generated using a first private key known to the UE and the position report message. As noted above, the security module may store one or more private keys known to the UE and may generate digital signature(s) using the one or more private keys for digitally signing the position report message. Means for performing functionality at block 610 may comprise a bus 805, processor(s) 810, wireless communication interface 830, memory 860, and/or other components of a UE 105, as illustrated in FIG. 8.

At block 640, the functionality comprises transmitting the position report message associated with the digital signature generated based on the first private key to a location application executed by the UE or another device, wherein the location application is configured to provide one or more location-based services to the UE using the position estimate responsive to a successful authentication of the position report message using the digital signature generated based on the first private key.

For example, after determining the digital signature, the security module may digitally sign the position report message. For example, the security module may associate the position report message with the digital signature generated based on the private key and the position report message (e.g., the content of the position report message) and may transmit the association of the position report message and the digital signature to a location application. In some embodiments, the position report message may also indicate a unique ID associated with UE 300 (e.g., a device ID of UE 300 such as IMEI, IMSI, MAC address, etc.).

In some embodiments, the location application may be configured to provide one or more location-based services to the UE using the position estimate responsive to a successful authentication of the position report message using the digital signature. As noted above, the location application may be executed by the UE (e.g., the location application being UE-based) or another device (e.g., executed by a server).

Means for performing functionality at block 610 may comprise a bus 805, processor(s) 810, wireless communication interface 830, memory 860, and/or other components of a UE 105, as illustrated in FIG. 8.

In some embodiments, when authenticating the position report message received from the position engine, the location application may request a public key corresponding to the private key used for generating the digital signature from the server. For example, the location application may transmit the device ID to the server (e.g., indicating the device ID in the request) where the server may determine the corresponding public key according to e.g., a device IDs/public keys lookup table. Responsive to the request, the server may transmit the corresponding public key to the location application where the location application may then authenticate the position report message using the digital signature generated based on the private key according to any suitable public key-private key authentication mechanisms.

In some embodiments, responsive to a successful authentication of the position report message, the location application may provide location-based services (e.g., navigation, local search, location-based advertising, social networking) to the UE based on the position estimates indicated in the position report message.

In some embodiments, if the location application is unable to authenticate the position report message, the location application may choose to disregard the position estimate indicated in the position report message received from the position engine and/or abandon the position report message.

In some embodiments, once the private key used by the security module for determining the digital signature used for signing the position report message is compromised, the location application may determine to disable the UE from receiving the location-based services and/or accessing the location application.

Additionally or alternatively, in situations where, for example, the UE is of high value and/or difficult to replace, once the private key used by the security module for determining the digital signature used for signing the position report message is compromised, the position engine may obtain from the security module, a subsequent digital signature generated based on a subsequent private key known to the UE and may transmit and digitally sign a subsequent position report message using the subsequent digital signature. The server may transmit a subsequent public key corresponding to the subsequent private key used for generating the subsequent digital signature to the location application responsive to receiving the authentication request (e.g., request for the corresponding public key). The location application may authenticate the subsequent position report message similar to the technical scheme disclosed above.

Figure 7:
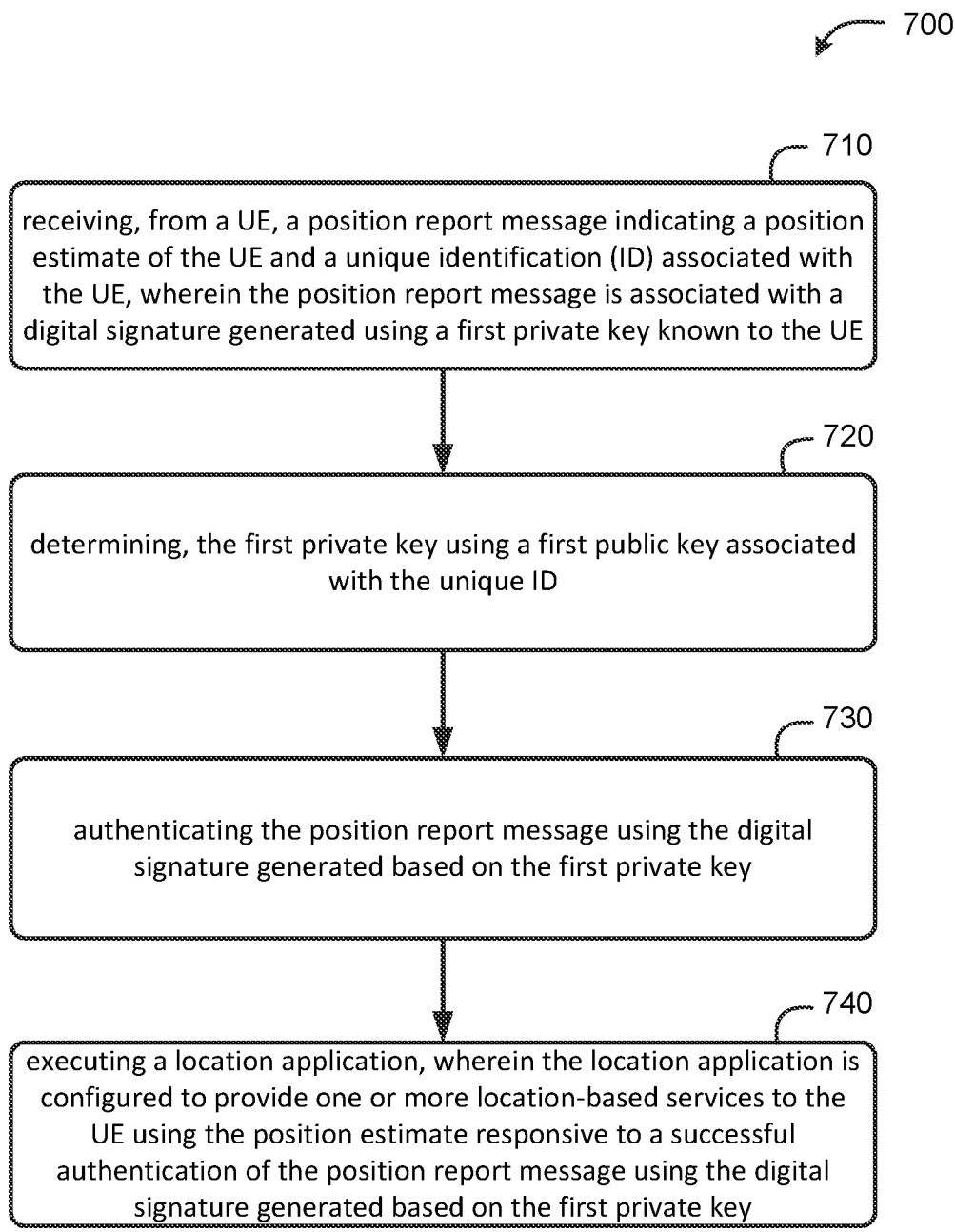
FIG. 7 is a flow diagram of a method for position information authentication for a location application, performed by a server, according to an embodiment.
Figure 9:
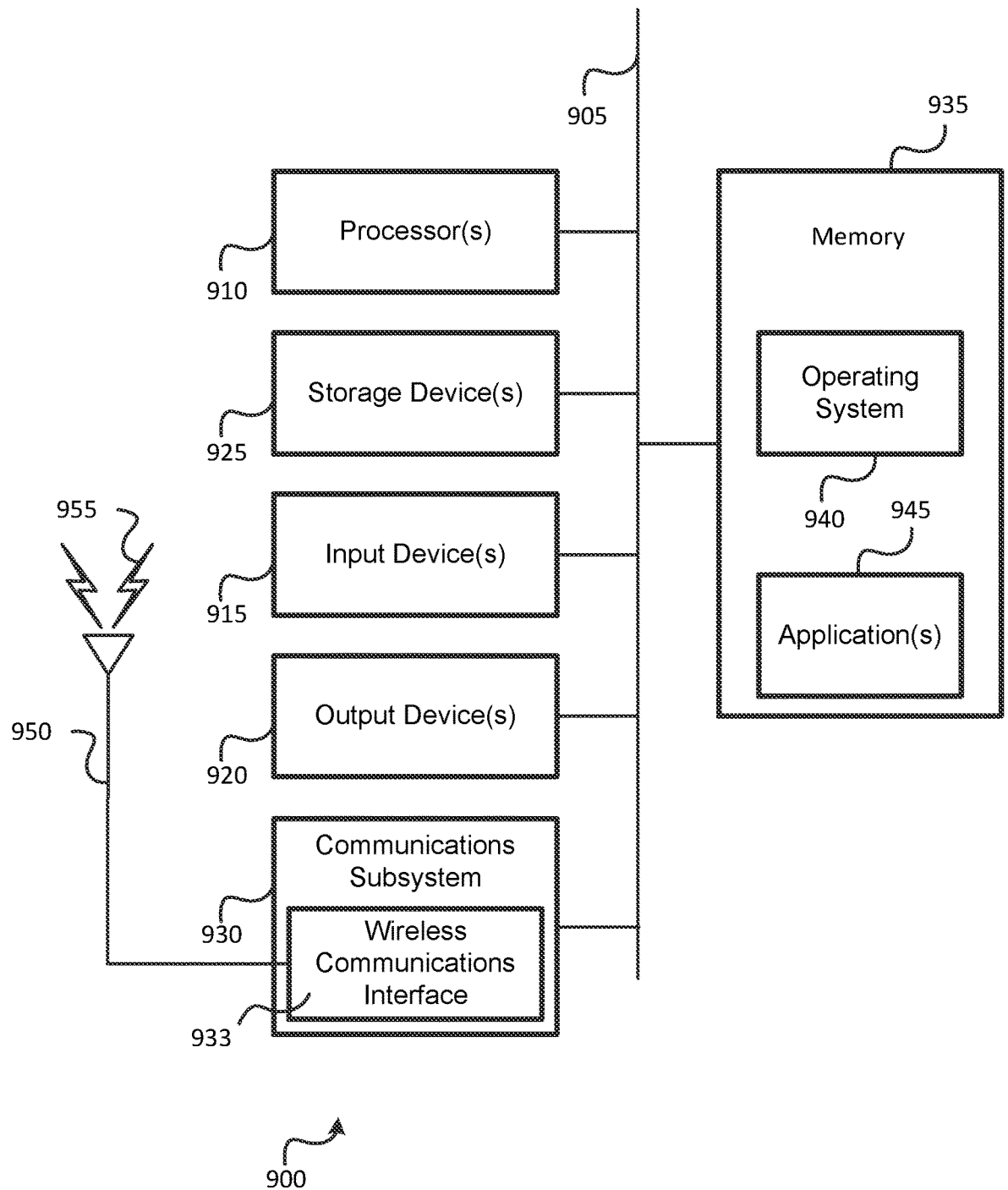
FIG. 9 is a block diagram of an embodiment of a computer system, which can be utilized in embodiments as described herein.

FIG. 7 is a flow diagram of a method 700 for position information authentication for a location application, performed by a server, according to an embodiment. In some embodiments, the server may correspond to location server 160 in FIG. 1, LMF 220 in FIG. 2, server 310 in FIG. 3, server 420 in FIG. 4, and/or server 520 in FIG. 5. Means for performing the functionality illustrated in one or more of the blocks shown in FIG. 7 may be performed by hardware and/or software components of a computer system. Example components of a computer system are illustrated in FIG. 9, which is described in more detail below.

At block 710, the functionality comprises receiving, from a UE, a position report message indicating a position estimate of the UE and a unique identification (ID) associated with the UE, wherein the position report message is associated with a digital signature generated using a first private key known to the UE. As noted above, the position report message may indicate an unique ID (e.g., a device ID) and a position estimate of the UE. Means for performing functionality at block 710 may comprise a bus 905, processor(s) 910, communications subsystem 930, memory 935, and/or other components of computer system 900, as illustrated in FIG. 9.

At block 720, the functionality comprises determining the first private key using a first public key associated with the unique ID. For example, the server may determine the corresponding public key based on the unique ID indicated in the position report message according to e.g., a device IDs/public keys lookup table. The server may then determine the private key using the corresponding public key. Means for performing functionality at block 720 may comprise a bus 905, processor(s) 910, communications subsystem 930, memory 935, and/or other components of computer system 900, as illustrated in FIG. 9.

At block 730, the functionality comprises authenticating the position report message using the digital signature generated based on the first private key. Means for performing functionality at block 730 may comprise a bus 905, processor(s) 910, communications subsystem 930, memory 935, and/or other components of computer system 900, as illustrated in FIG. 9.

At block 740, the functionality comprises executing a location application, wherein the location application is configured to provide one or more location-based services to the UE using the position estimate responsive to a successful authentication of the position report message using the digital signature generated based on the first private key. Means for performing functionality at block 740 may comprise a bus 905, processor(s) 910, communications subsystem 930, memory 935, and/or other components of computer system 900, as illustrated in FIG. 9.

In some embodiments, if the location application is unable to authenticate the position report message, the location application may choose to disregard the position estimate indicated in the position report message received from the position engine and/or abandon the position report message.

In some embodiments, once the private key used by the security module for determining the digital signature used for signing the position report message is compromised, the location application may determine to disable the UE from receiving the location-based services and/or accessing the location application.

Additionally or alternatively, in situations where, for example, the UE is of high value and/or difficult to replace, once the private key used by the security module for determining the digital signature used for signing the position report message is compromised, the position engine may obtain from the security module, a subsequent digital signature generated based on a subsequent private key known to the UE and may transmit and digitally sign a subsequent position report message using the subsequent digital signature. The server may transmit a subsequent public key corresponding to the subsequent private key used for generating the subsequent digital signature to the location application responsive to receiving the authentication request (e.g., request for the corresponding public key). The location application may authenticate the subsequent position report message similar to the technical scheme disclosed above.

FIG. 8 is a block diagram of an embodiment of a UE 105, which can be utilized as described herein above (e.g., in association with FIGS. 3-7). For example, the UE 105 can perform one or more of the functions of the method shown in FIG. 6. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 8.

The UE 105 is shown comprising hardware elements that can be electrically coupled via a bus 805 (or may otherwise be in communication, as appropriate). The hardware elements may include a processor(s) 810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 810 may comprise one or more processing units, which may be housed in a single integrated circuit (IC) or multiple ICs. As shown in FIG. 8, some embodiments may have a separate DSP 820, depending on desired functionality. Location determination and/or other determinations based on wireless communication may be provided in the processor(s) 810 and/or wireless communication interface 830 (discussed below). The UE 105 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The UE 105 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 830 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 810 or DSP 820.

The UE 105 may further include and/or be in communication with a memory 860. The memory 860 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processor(s) 810 or DSP 820 within UE 105). In some embodiments, then, such code and/or instructions can be used to configure and/or adapt a general-purpose computer (or other device) to perform one or more operations in accordance with the described methods.

FIG. 9 is a block diagram of an embodiment of a computer system 900, which may be used, in whole or in part, to provide the functions of one or more network components as described in the embodiments herein above (e.g., in association with FIGS. 3-7). For example, computer system 900 (e.g., corresponds to location server 160 in FIG. 1) can perform one or more of the functions of the method shown in FIG. 7. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a bus 905 (or may otherwise be in communication, as appropriate). The hardware elements may include processor(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 900 may also include a communications subsystem 930, which may comprise wireless communication technologies managed and controlled by a wireless communication interface 933, as well as wired technologies (such as Ethernet, coaxial communications, universal serial bus (USB), and the like). The wireless communication interface 933 may comprise one or more wireless transceivers that may send and receive wireless signals 955 (e.g., signals according to 5G NR or LTE) via wireless antenna(s) 950. Thus the communications subsystem 930 may comprise a modem, a network card (wireless or wired), an infrared communication device, a wireless communication device, and/or a chipset, and/or the like, which may enable the computer system 900 to communicate on any or all of the communication networks described herein to any device on the respective network, including a User Equipment (UE), base stations and/or other TRPs, and/or any other electronic devices described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method of position information authentication for a location application performed by a UE, the method comprising determining by a position engine, a position estimate of the UE and determining by the position engine, a position report message indicating the position estimate. The method also comprises determining by a security module, a digital signature generated using a first private key known to the UE and the position report message. The method further comprises transmitting the position report message associated with the digital signature to a location application executed by the UE or another device, wherein the location application is configured to provide one or more location-based services to the UE using the position estimate responsive to a successful authentication of the position report message using the digital signature generated based on the first private key.

Clause 2. The method of clause 1, wherein the position report message further indicates a unique identification (ID) associated with the UE Clause 3. The method of any of clause 1 or 2, wherein the unique ID comprises: international mobile equipment identity (IMEI) of the UE; international mobile subscriber identity (IMSI) of the UE; media access control (MAC) address; or any combination thereof.

Clause 4. The method of any of clauses 1-3, wherein the location application is executed by the UE.

Clause 5. The method of any of clauses 1-4, further comprising: responsive to the location application not successfully authenticating the position report message, abandoning the position report message.

Clause 6. The method of any of clauses 1-5, further comprising: transmitting the unique ID to a server; receiving from the server, a first public key associated with the unique ID; and determining the first private key using the first public key.

Clause 7. The method of any of clauses 1-6, further comprising: responsive to determining that the first private key has been compromised, disabling the UE from accessing the location application.

Clause 8. The method of any of clauses 1-7, further comprising: responsive to determining that the first private key has been compromised, determining by the security module, a subsequent digital signature based on a second private key known to the UE; and transmitting a subsequent position report message associated with the subsequent digital signature to the location application.

Clause 9. The method of any of clauses 1-8, wherein the position estimate is determined using a reference signal comprising a global navigation satellite system (GNSS) signal.

Clause 10. An example method of position information authentication for a location application performed by a server, the method comprising receiving, from a UE, a position report message indicating a position estimate of the UE and a unique identification (ID) associated with the UE, wherein the position report message is associated with a digital signature generated using a first private key known to the UE. The method also comprises determining the first private key using a first public key associated with the unique ID and authenticating the position report message using the digital signature generated based on the first private key. The method further comprises executing a location application, wherein the location application is configured to provide one or more location-based services to the UE using the position estimate responsive to a successful authentication of the position report message using the digital signature generated based on the first private key.

Clause 11. The method of clause 10, wherein the unique ID comprises: international mobile equipment identity (IMEI) of the UE; international mobile subscriber identity (IMSI) of the UE; media access control (MAC) address; or any combination thereof.

Clause 12. The method of clause 10 or 11, further comprising: responsive to not successfully authenticating the position report message, abandoning the position report message.

Clause 13. The method of clauses 10-12, further comprising: responsive to determining that the first private key has been compromised, disabling the UE from accessing the location application.

Clause 14. The method of clauses 10-13, further comprising: responsive to determining that the first private key has been compromised, determining a second private key known to the UE using a second public key associated with the unique ID; and authenticating the position report message using a subsequent digital signature generated based on the second private key.

Clause 15. The method of clauses 10-14, wherein the position estimate is determined using a reference signal comprising a global navigation satellite system (GNSS) signal.

Clause 16. An example UE for geofencing for position information authentication for a location application comprising a transceiver, a memory, and one or more processors communicatively coupled with the transceiver and the memory. The one or more processors are configured to determine a position estimate of the UE and determine a position report message indicating the position estimate. The one or more processors are also configured to determine a digital signature generated using a first private key known to the UE and the position report message. The one or more processors are further configured to transmit the position report message associated with the digital signature to a location application executed by the UE or another device, wherein the location application is configured to provide one or more location-based services to the UE using the position estimate responsive to a successful authentication of the position report message using the digital signature generated based on the first private key.

Clause 17. The UE of the clause 16, wherein the position report message further indicates a unique identification (ID) associated with the UE.

Clause 18. The UE of any of clause 16 or 17, wherein the unique ID comprises: international mobile equipment identity (IMEI) of the UE; international mobile subscriber identity (IMSI) of the UE; media access control (MAC) address; or any combination thereof.

Clause 19. The UE of any of clauses 16-18, wherein the location application is executed by the UE.

Clause 20. The UE of any of clauses 16-19, further comprising: responsive to the location application not successfully authenticating the position report message, abandon the position report message.

Clause 21. The UE of any of clauses 16-20, wherein the one or more processors are further configured to: transmitting the unique ID to a server; receiving from the server, a first public key associated with the unique ID; and determining the first private key using the first public key.

Clause 22. The UE of any of clauses 16-21, wherein the one or more processors are further configured to: responsive to determining that the first private key has been compromised, disable the UE from accessing the location application.

Clause 23. The UE of any of clauses 16-22, wherein the one or more processors are further configured to: responsive to determining that the first private key has been compromised, determine, a subsequent digital signature based on a second private key known to the UE; and transmit a subsequent position report message associated with the subsequent digital signature to the location application.

Clause 24. The UE of any of clauses 16-23, wherein the position estimate is determined using a reference signal comprising a global navigation satellite system (GNSS) signal.

Clause 25. An example server for position information authentication for a location application comprising a transceiver, a memory, and one or more processors communicatively coupled with the transceiver and the memory. The one or more processors are configured to receive, from a UE, a position report message indicating a position estimate of the UE and a unique identification (ID) associated with the UE, wherein the position report message is associated with a digital signature generated using a first private key known to the UE and determine the first private key using a first public key associated with the unique ID. The one or more processors are also configured to authenticate the position report message using the digital signature generated based on the first private key. The one or more processors are further configured to and execute a location application, wherein the location application is configured to provide one or more location-based services to the UE using the position estimate responsive to a successful authentication of the position report message using the digital signature generated based on the first private key.

Clause 26. The server of the clause 25, wherein the unique ID comprises: international mobile equipment identity (IMEI) of the UE; international mobile subscriber identity (IMSI) of the UE; media access control (MAC) address; or any combination thereof.

Clause 27. The server of any of clause 25 or 26, wherein the one or more processors are further configured to: responsive to not successfully authenticating the position report message, abandon the position report message.

Clause 28. The server of any of clauses 25-27, wherein the one or more processors are further configured to: responsive to determining that the first private key has been compromised, disable the UE from accessing the location application.

Clause 29. The server of any of clauses 25-28, wherein the one or more processors are further configured to: responsive to determining that the first private key has been compromised, determine a second private key known to the UE using a second public key associated with the unique ID; and authenticate the position report message using a subsequent digital signature generated based on the second private key.

Clause 30. The server of any of clauses 25-29, wherein the position estimate is determined using a reference signal comprising a global navigation satellite system (GNSS) signal.

What is claimed is:

1. A method of position information authentication of a User Equipment (UE), the UE having a unique identification (ID) associated therewith, for a location application, the method comprising:
   determining, by a position engine of the UE, a position estimate of the UE;
   determining, by the position engine, a position report message indicating the unique ID and the position estimate;
   determining, by a security module of the UE, a digital signature generated using a first private key of the UE;
   digitally signing the position report message using the digital signature generated using the first private key;
   providing the digitally signed position report message and the unique ID to the location application, wherein the location application is configured to determine whether to authenticate the digitally signed position report message using the unique ID and a public key lookup table that associates a respective public key with the unique ID of the UE;
   responsive to determining that the first private key has been compromised, determining by the security module of the UE, a subsequent digital signature generated using a second private key of the UE; and
   providing to the location application a subsequent position report message digitally signed using the subsequent digital signature.

2. The method of claim 1, wherein the unique ID comprises:
   international mobile equipment identity (IMEI) of the UE;
   international mobile subscriber identity (IMSI) of the UE;
   media access control (MAC) address; or
   any combination thereof.

3. The method of claim 1, wherein the location application is executed by the UE.

4. The method of claim 3, further comprising:
   responsive to the location application being unable to authenticate the position report message, abandoning the position report message.

5. The method of claim 1, further comprising:
   transmitting the unique ID to a server;
   receiving from the server, the respective public key associated with the unique ID and the first private key.

6. The method of claim 3, further comprising:
   responsive to determining that the second private key has been compromised, disabling the UE from accessing the location application.

7. The method of claim 1, wherein the location application is configured to provide one or more location-based services to the UE upon authenticating the subsequent position report message.

8. The method of claim 1, wherein the position estimate is determined using a reference signal comprising a global navigation satellite system (GNSS) signal.

9. A method of position information authentication of a User Equipment (UE) for a location application, the method performed by a server and comprising:
   receiving, from the UE, a digitally signed position report message indicating a position estimate of the UE and a unique identification (ID) associated with the UE, wherein the digitally signed position report message is digitally signed using a digital signature generated using a first private key of the UE;
   based on the first private key having been compromised, receiving, from the UE, a subsequent digitally signed position report message, wherein the subsequent digitally signed position report message is digitally signed using a digital signature generated based on a second private key;
   determining whether to authenticate the subsequent digitally signed position report message using the unique ID and a public key lookup table that associates a respective public key with the unique ID of the UE;
   responsive to determining to authenticate the subsequent digitally signed position report message, executing the location application, wherein the location application is configured to authenticate the subsequent digitally signed position report message based on the respective public key and provide one or more location-based services to the UE using the position estimate.

10. The method of claim 9, wherein the unique ID comprises:
   international mobile equipment identity (IMEI) of the UE;
   international mobile subscriber identity (IMSI) of the UE;
   media access control (MAC) address; or
   any combination thereof.

11. The method of claim 9, wherein the digitally signed position report message and the subsequent digitally signed position report message are provided by a security module of the UE.

12. The method of claim 9, further comprising:
   responsive to a determination that the second private key has been compromised, disabling the UE from accessing the location application.

13. The method of claim 9, wherein the location-based services include at least one of: navigation, search, location-based advertising, or social networking.

14. The method of claim 9, wherein the position estimate is determined using a reference signal comprising a global navigation satellite system (GNSS) signal.

15. A user equipment (UE) for position information authentication for a location application, the UE comprising:
   a transceiver;
   a memory; and
   one or more processors communicatively coupled with the transceiver and the memory, wherein the one or more processors are configured to:
      determine a position estimate of the UE;
      determine a position report message indicating a unique identification (ID) associated with the UE and the position estimate;
      determine a digital signature generated using a first private key of the UE;
      digitally sign the position report message using the digital signature generated using the first private key;
      provide the digitally signed position report message to the location application, wherein the location application is configured to determine whether to authenticate the digitally signed position report message using the unique ID and a public key lookup table that associates a respective public key with the unique ID of the UE;
      responsive to determining that the first private key has been compromised, determine a subsequent digital signature generated using a second private key of the UE; and
      provide to the location application a subsequent position report message digitally signed using the subsequent digital signature.

16. The UE of claim 15, wherein the unique ID comprises:
   international mobile equipment identity (IMEI) of the UE;
   international mobile subscriber identity (IMSI) of the UE;
   media access control (MAC) address; or
   any combination thereof.

17. The UE of claim 15, wherein the location application is executed by the UE.

18. The UE of claim 17, wherein the one or more processors are further configured to, responsive to the location application being unable to authenticate the position report message, abandon the position report message.

19. The UE of claim 15, wherein the one or more processors are further configured to:
   transmit the unique ID to a server;
   receive, from the server, a first public key associated with the unique ID and the first private key.

20. The UE of claim 17, wherein the one or more processors are further configured to:
   responsive to determining that the second private key has been compromised, disable the UE from accessing the location application.

21. The UE of claim 15, wherein the location application is configured to provide one or more location-based services to the UE upon authenticating the subsequent position report message.

22. The UE of claim 15, wherein the position estimate is determined using a reference signal comprising a global navigation satellite system (GNSS) signal.

23. A server for position information authentication of a User Equipment (UE) for a location application comprising:
   a transceiver;
   a memory; and
   one or more processors communicatively coupled with the transceiver and the memory, wherein the one or more processors are configured to:
      receive, from the UE, a digitally signed position report message indicating a position estimate of the UE and a unique identification (ID) associated with the UE, wherein the digitally signed position report message is digitally signed using a digital signature generated using a first private key of the UE;
      based on the first private key having been compromised, receive, from the UE, a subsequent digitally signed position report message, wherein the subsequent digitally signed position report message is digitally signed using a digital signature generated based on a second private key;
      determine whether to authenticate the subsequent digitally signed position report message using the unique ID and a public key lookup table that associates a respective public key with the unique ID of the UE;
      responsive to determining to authenticate the subsequent digitally signed position report message, execute the location application, wherein the location application is configured to authenticate the subsequent digitally signed position report message based on the respective public key and provide one or more location-based services to the UE using the position estimate.

24. The server of claim 23, wherein the unique ID comprises:
   international mobile equipment identity (IMEI) of the UE;
   international mobile subscriber identity (IMSI) of the UE;
   media access control (MAC) address; or
   any combination thereof.

25. The server of claim 23, wherein the digitally signed position report message and the subsequent digitally signed position report message are provided by a security module of the UE.

26. The server of claim 23, wherein the one or more processors are further configured to:
   responsive to a determination that the second private key has been compromised, disable the UE from accessing the location application.

27. The server of claim 23, wherein the location-based services include at least one of: navigation, search, location-based advertising, or social networking.

28. The server of claim 23, wherein the position estimate is determined using a reference signal comprising a global navigation satellite system (GNSS) signal.

* * * * *